United States Patent [19]

Saretzky

[11] Patent Number: 4,972,925
[45] Date of Patent: Nov. 27, 1990

[54] PROGRESSIVE DISTRIBUTOR

[75] Inventor: Horst Saretzky, Ennepetal, Fed. Rep. of Germany

[73] Assignee: DeLimon Fluhme GmbH & Co., Duesseldorf, Fed. Rep. of Germany

[21] Appl. No.: 337,962

[22] Filed: Apr. 14, 1989

[30] Foreign Application Priority Data

Apr. 20, 1988 [DE] Fed. Rep. of Germany ....... 3813189

[51] Int. Cl.⁵ .................. F16N 27/00; F16N 25/02
[52] U.S. Cl. ................................................ 184/7.4
[58] Field of Search .................................... 184/7.4

[56] References Cited

U.S. PATENT DOCUMENTS

| 2,155,250 | 4/1939 | Barks | 184/7.4 |
| 2,425,515 | 8/1947 | Davis | 184/7.4 |
| 2,919,769 | 1/1960 | Burton | 184/7.4 |
| 3,543,881 | 12/1970 | Obergefell | 184/7.4 |
| 3,995,717 | 12/1976 | Kroffke | 184/7.4 |

FOREIGN PATENT DOCUMENTS 3412836 10/1975 Fed. Rep. of Germany .

Primary Examiner—Douglas Hart
Attorney, Agent, or Firm—Robert W. Becker & Associates

[57] ABSTRACT

A progressive distributor, for a central grease and oil lubrication unit, with which lubricant that is supplied under pressure can be delivered to several areas of use. The distributor includes several interconnected individual sections, each of which is provided with a piston as well as lubricant outlets to the areas of use. A pressure reservoir is associated with at least one of the lubricant outlets. When a disruption occurs during operation of the distributor, the pressure reservoir takes up and stores lubricant, and delivers this lubricant to the disrupted area of use at a later point in time.

9 Claims, 3 Drawing Sheets

PROGRESSIVE DISTRIBUTOR

BACKGROUND OF THE INVENTION

The present invention relates to a progressive distributor, for a central grease and oil lubrication unit, with which lubricant that is supplied under pressure can be delivered to several areas of use. Such a progressive distributor normally comprises several individual sections that are screwed or otherwise connected together and are sealed relative to one another. Each of the individual sections is provided with a piston that is alternately pressed bY the lubricant into its two end positions. With the aid of annular grooves, the pistons are controlled in a certain sequence in such a way that the next piston cannot be displaced until the piston movement of the preceding piston is nearly concluded. All of the piston bores of the individual sections are directly connected by a central bore to an inlet that is supplied via a lubricant line with lubricant that is under an operating pressure of up to about 400 bar.

Each individual section of a progressive distributor is provided with two outlets, so that lubricant supplied thereto can be progressively delivered in a certain sequence and in small, metered quantities to the connected friction locations. After the last friction location has been supplied with lubricant, the lubricating process automatically restarts with the first friction location. If the lubricating process is interrupted at any of the locations by shutdown of the pump or blockage of the pressure line, when the system is reactivated the lubricating process starts again at this location.

For further background with regard to the functioning of a progressive distributor, reference is hereby made to U.S. Pat. No. 3,783,973-Kurten et al, dated Jan. 8, 1974, which patent is being incorporated into this disclosure by this reference thereto.

With the use of such progressive distributors in progressive central lubrication units, it can happen that during the distributor cycle (movement of all pistons to a lubricant discharge position), one or the other lubricating location cannot immediately receive the intended quantity of lubricant. The distributor then maintains a given position in the cycle and is caught in a so-called standstill phase which under certain circumstances can last a long period of time. During this time the other connected friction locations cannot and are not supplied with lubricant, which can lead to inadequate lubrication of these locations. This is particularly true for oil lubrication systems.

Various causes can underlie a delayed delivery of lubricant. For example, lubricating location gaps can temporarily be reduced in size by dirt particles, or system-related problems can temporarily block lubricant inlet bores at the friction locations. This is the case, for example, when due to a momentary load phase of a shaft journal during its rotation in a bearing, the lubricant inlet bore thereof is closed in such a way that not even the operating pressure of the unit is sufficient to free the bore. Although such a blockage is only temporary due to the movement of the shaft, it nonetheless leads to a standstill of the distributor cycle.

It is therefore an object of the present invention, while avoiding the aforementioned drawbacks, to improve a progressive distributor for central grease and oil lubrication units in such a way that even where the delivery of lubricant to one or more areas of use is delayed in time, the cyclical operation is not adversely affected and the delivery of lubricant to the disrupted area of use is made possible at a later point in time.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The progressive distributor of the present invention is characterized primarily by pressure reservoir means associated with one, several, or all of the lubrication outlets; when a disruption occurs in the operation of the distributor, the pressure reservoir means takes up and stores lubricant, and delivers this lubricant to the disrupted area of use at a later point in time. During a so-called lubricating and friction location blockage, or an impedance in the delivery of the lubricant at the friction location, the delivered quantity of lubricant is taken up in the distributor by the pressure reservoir without any reactive effect, and then at the moment that the lubricating location is again freed, or after a longer period of time, this lubricant is delivered from the pressure reservoir to the friction location. For example, with oil circulation systems release or freeing of a lubricating location occurs in seconds after blockage, so that returning distributor cycles do not lead to blockage or disruption of the distributor due, for example, to double or triple storage situations. The pressure reservoir is preferably connected directly to the respective outlet channel and forms a compact unit with the distributor. However, it is also possible to dispose the pressure reservoir between the distributor outlet and the area of use, for example in the lubricant line, or directly at the area of use.

In one preferred specific embodiment the inventive distributor, in order to improve its operation and make it more reliable, is provided with a check valve that prevents the distributor piston from moving backwards when the counter-pressure at the outlet increases. Expediently, the check valve is disposed directly in the connection region of the pressure reservoir to the lubricant outlet, and comprises a spring-loaded valve closure member that is suitable for closing the connection of the lubricant outlet to the cylinder of the working piston, yet leaves the inlet to the pressure reservoir free. The pressure reservoir preferably comprises a housing in which is disposed a spring-loaded piston, a threaded connector that can be screwed into a connector channel of the lubricant outlet of the distributor, and a multi-cornered element that is disposed in the connector channel for providing lubricant passages into the pressure reservoir; the multi-cornered element carries a spring-loaded conical member, as a valve closure member, that cooperates with a corresponding conical bore of the channel that connects the piston chamber with the lubricant outlet.

It should be noted that in place of the spring-loaded, piston, it would also be possible to use a gas-filled piston pressure reservoir or a diaphragm pressure reservoir.

Further specific features of the present invention will be described in detail subsequently.

DESCRIPTION OF PREFERRED EMBODIMENTS

Figure 2:
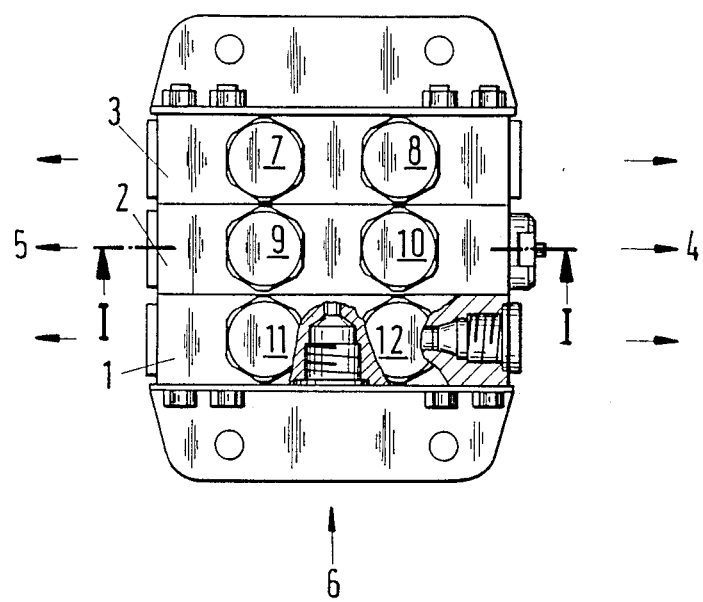
FIG. 2 is a top view of the progressive distributor of FIG. 1.

Referring now to the drawings in detail, in principle progressive distributors of the type illustrated in the drawings comprise at least three individual sections 1, 2, and 3 that are bolted or otherwise connected to one another, and that are sealed relative to one another. Each distributor section 1, 2, 3 is provided with a piston (not illustrated) that is alternately pressed into its two end positions by lubricant. With the aid of annular grooves, the pistons are successively controlled in a specific sequence in such a way that the next piston cannot be shifted until the piston movement of, the previous piston is nearly concluded. For this purpose, all of the piston bores are directly connected via a central bore to the inlet into the progressive distributor to which is connected either the lubricant supply line or preceding introduction and dual-line distributors. With this type of distributor, the piston movements are automatically continued as long as lubricant is supplied to the inlet. Consequently, with this procedure, each working piston in the progressive sequence is at the same time a control piston for the subsequent working piston. In the normal situation, associated with each piston are two lubricant outlets 4, 5 that as a function of the piston diameter and stroke discharge a certain quantity of lubricant in conformity with the piston stroke movement to the left and to the right. As can be seen from FIG. 2 of the drawings, the illustrated progressive distributor has a total of six outlets, which are schematically indicated by arrows. A lubricant inlet 6 is also indicated by an arrow in FIG. 2 that is directed upwardly from the bottom. Via this lubricant inlet 6, the progressive distributor can be connected to a supply line of a central lubrication unit.

Figure 1:
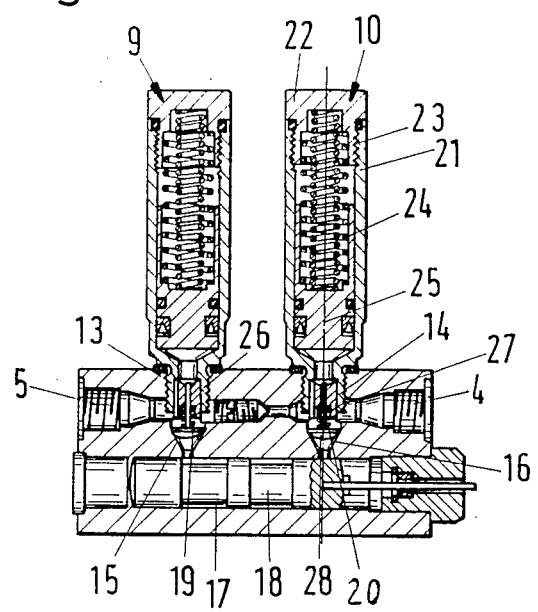
FIG. 1 is a cross-sectional view, taken along the line I—I in FIG. 2, of a portion of one exemplary embodiment of the inventive progressive distributor showing two pressure reservoirs.

Disposed on the progressive distributor are six pressure reservoirs 7, 8, 9, 10, 11, and 12 that are associated with the six outlets. This arrangement can be more clearly seen in the crosssectional view of FIG. 1. In particular, FIG. 1 shows the pressure reservoirs 9, 10 that are associated with the lubricant outlets 4, 5 of the central individual section 2 of the distributor. The pressure reservoirs 9, 10 are each screwed into a respective connector channel 13, 14 of the individual section 2; these connector channnels 13, 14 open into a respective one of the lubricant outlets 5 or 4. Disposed across from each connector channel 13, 14 is a respective connecting bore 15, 16 to the cylinder 17 of the piston 18, via which lubricant can be conveyed to the outlets 4, 5. The connecting bores 15, 16 are provided with conical seats for check valves 19, 20 of the pressure reservoirs 9, 10, as will be described in detail subsequently.

Each pressure reservoir 9, 10 comprises a cylindrical housing 21 that is closed off by a threaded closure cap 22. The closure cap 22 has a collar-like extension 23 that in the inside extends parallel to the housing 21, is provided with a shoulder, and holds and guides a double spring 24 that loads a piston 25 which is disposed in a sealed manner in the housing 21. The housing 21 merges into a threaded connector 26 that is screwed into the pertaining connector channel 14. A fourcornered element 27 is press fitted into the connector 26 in such a way that four flow passages are formed for conveying lubricant into and out of the pressure reservoir. The four-cornered element 27 carries a spring-loaded valve body 28 that cooperates with the conical portion of the connecting bore 16 as a valve seat to form the check valve 20.

If during operation of the lubricant distributor a disruption occurs, for example in the lubricant discharge of the outlet 4, in that, for example, the lubricant line to the user becomes crimped, resulting in a reduction of the inner free diameter, or the opening to the friction location is temporarily closed, so that no lubricant can be discharged, this lubricant enters the pressure reservoir 10, accompanied by displacement of the piston 25 against the pressure of the double spring 24, and is stored in the reservoir 10. When the pressure is relieved, the piston 25, under the effect of the double spring 24, moves back into its starting position and displaces the lubricant that is present in the pressure reservoir into the outlet 4 and hence to the area of use. The foregoing assures that the normal operating sequence of the distributor continues despite the temporary disruption, and that all of the following friction locations are supplied with lubricant. Furthermore, from the pressure reservoir the supply of the adversely affected friction location takes place, so that the satisfactory overall functioning of the progressive distributor is maintained.

Figure 3:
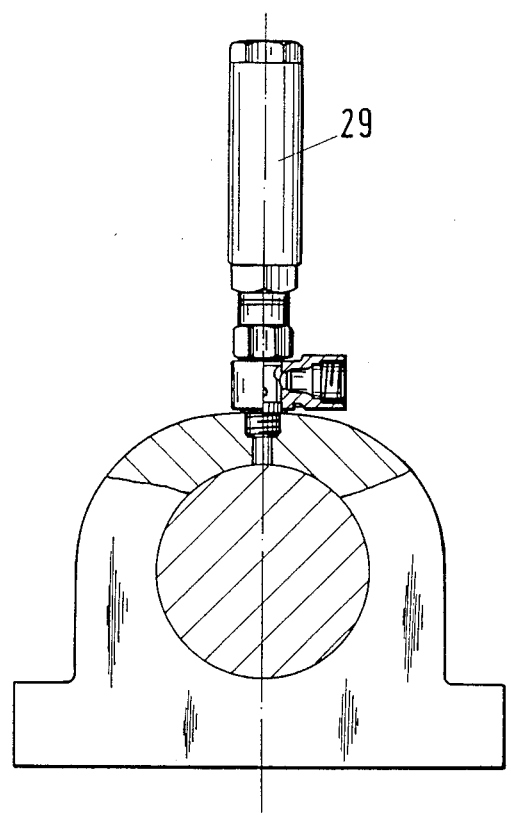
FIG. 3 is a view that shows a pressure reservoir, which is associated with the outlet of the progressive distributor of FIG. 2, as disposed on a lubricating location.
Figure 4:
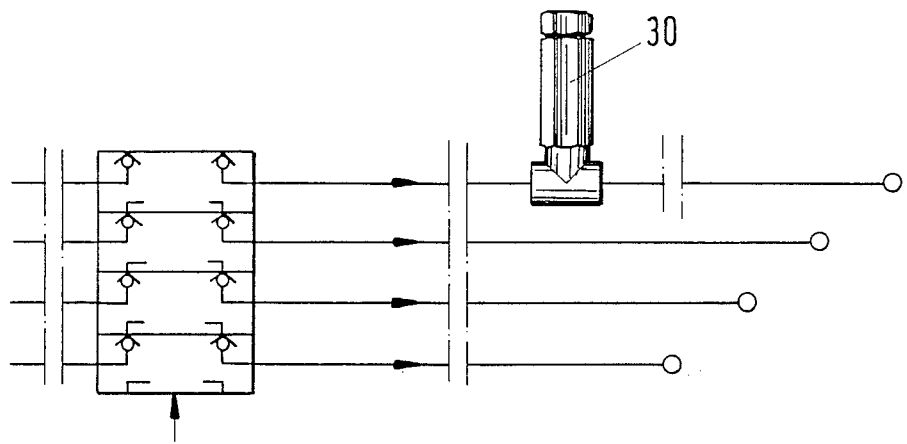
FIG. 4 is a view that shows a pressure reservoir, which is associated with an outlet of a progressive distributor, disposed in the line between the lubrication outlet and a friction location.
Figure 5:
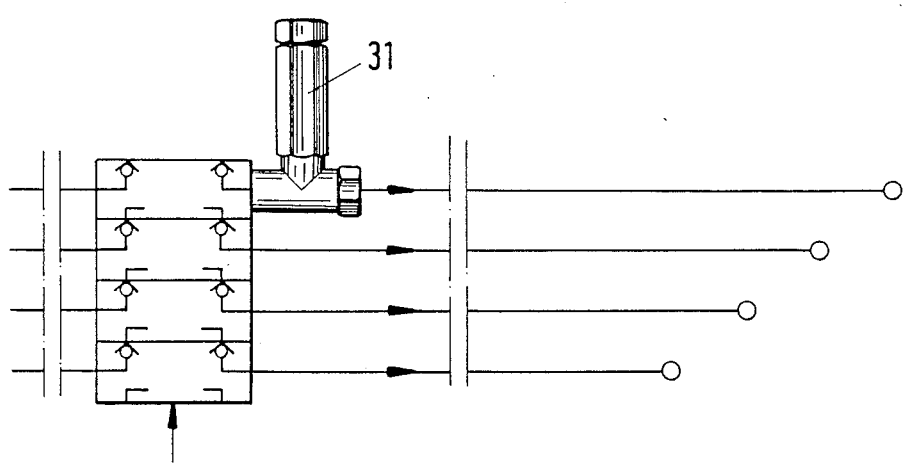
FIG. 5 is a view that shows a pressure reservoir disposed directly on the outlet of a progressive distributor.

FIG. 3 shows, by way of example, a pressure reservoir 29 that is directly connected to an area of use. In contrast, in FIG. 4, the pressure reservoir 30 that is associated with one of the outlets of a progressive distributor is disposed in the connecting line between the outlet and the area of use. As shown in FIG. 5, it is also possible to dispose a pressure reservoir 31 coaxial to the outlet of the progressive distributor. How these various possibilities, either individually or in combination with one another, can be used is a function of the construction and space for the installed central lubrication unit.

The present invention is, of course, in no way restricted to the specific disclosure of the specification and drawings, but also encompasses any modifications within the scope of the appended claims.

What I claim is:

1. In a progressive distributor, for a central grease and oil lubrication unit, with which lubricant that is supplied under pressure can be delivered to connected friction locations in several areas of use at a lubricating location in an automatic restarting distributor cyclical operation in a certain sequence, and including several interconnected individual sections, each of which is provided with a piston as well as lubricant outlets to said areas of use, the improvement comprising:

pressure reservoir means associated with at least one of said lubricant outlets; when a disruption occurs during operation of said progressive distributor, said pressure reservoir means takes up and stores lubricant without any interruption in said operation even when this lubricant cannot be supplied to the disrupted area of use, and delivers this lubricant to the disrupted area of use at a later point in time after the lubricating location is again freed with a time delayer although other connected friction locations have lubricant delivered thereto without any interruption in said operation.

2. A progressive distributor according to claim 1, in which said pressure reservoir means is disposed directly on a respective outlet channel, and forms a unit with said distributor.

3. A progressive distributor according to claim 1, in which said pressure reservoir means is disposed between a lubricant outlet and an area of use.

4. A progressive distributor according to claim 1, in which said pressure reservoir means is disposed directly on an area of use.

5. A progressive distributor according to claim 2, in which said pressure reservoir means cooperates with a check valve.

6. A progressive distributor according to claim 5, in which said check valve is disposed in a region where said pressure reservoir means is connected to said lubricant outlet, with said check valve comprising a spring-loaded valve body that is adapted to close a connecting means between said piston and said lubricant outlet while leaving free inlet means t o said pressure reservoir means.

7. A progressive distributor according to claim 6, in which said pressure reservoir means comprises a housing in which is disposed a springloaded further piston and which includes a threaded connector that is adapted to be screwed into said inlet means, which is in the form of a connector channel to connect said lubricant outlet and said pressure reservoir means; disposed in said connector is a multi-cornered element for providing lubricant passages to said pressure reservoir means, with said multi-cornered element carrying, in the form of a conical element, said springloaded valve body, which cooperates with said connecting means, which is in the form of a connecting bore and has a corresponding conical configuration.

8. A progressive distributor according to claim 1, in which said pressure reservoir means is a gas-filled piston pressure reservoir.

9. A progressive distributor according to claim 1, in which said pressure reservoir means is a diaphragm pressure reservoir.

* * * * *